Patented Oct. 14, 1924.

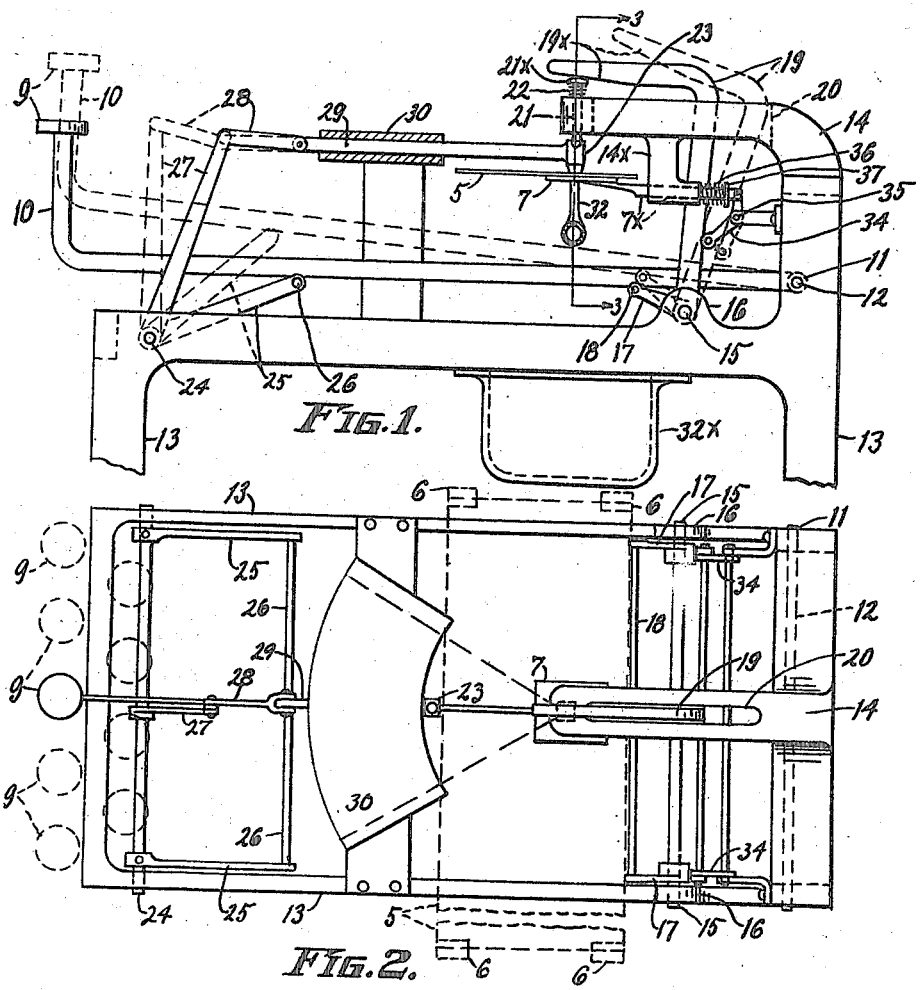

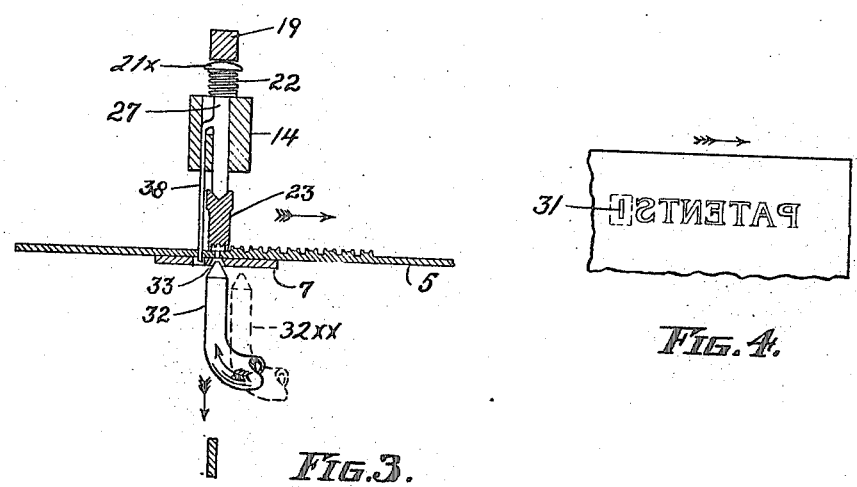

1,511,733

UNITED STATES PATENT OFFICE.

JAMES F. LACKEY, OF ST. PAUL, MINNESOTA.

TYPE-MAKING MACHINE.

Application filed April 12, 1922. Serial No. 551,883.

*To all whom it may concern:*

Be it known that I, JAMES F. LACKEY, a citizen of the United States, residing at St. Paul, in the county of Ramsey and State of Minnesota, have invented a new and useful Type-Making Machine, of which the following is a specification.

My invention relates to typemaking devices and the object is to provide a simple, efficient and rapid means and method for setting type in such a manner that they are available for printing purposes with little or no loss of time.

In the accompanying drawing:

Fig. 1 is a side elevation of machine built to make type by my new method, a number of details of construction being omitted.

Fig. 2 is a top view of Fig. 1 with a number of additional parts to illustrate the use of my device on the principle of a typewriting machine.

Fig. 3 is an enlarged sectional elevation on line 3—3 in Fig. 1.

Fig. 4 is an enlarged fractional detail view of a portion of a type sheet used in my device several letters appearing on the surface of the sheet.

Referring to the drawing by reference numerals, 5 designates a sheet made of typemetal adapted to be held at its opposite ends by suitable clamps 6 of a carriage (not shown) which moves in a manner similar to a typewriter carriage. Said sheet is guided on top of and across a small plate 7. As already indicated my device is operated on the typewriter principle, having the proper number of keys 9 on levers 10 (only one unit being shown in Fig. 1) pivoted at 11 on a shaft 12 journaled in the rear portion of a main frame 13. An upwardly and forwardly projecting arm 14 extending from the rear of the frame terminates over plate 7 and a depending lug 14$^x$ provides a bearing for a sliding bar 7$^x$ attached to plate 7 and projecting rearwardly through said lug.

A transverse shaft 15 pivoted in oppositely arranged lugs 16 of the frame 13 carries two short levers 17 normally projecting upwardly and forwardly and another transverse shaft 18 is extended across the frame between the forward ends of said levers 17. This shaft 18 is engaged and pushed downwardly by anyone of the key bars 10 arranged above it. This motion rocks shaft 15 which has an inverted L-shaped bar 19 secured to its center portion, projecting upwardly through a slot 20 in arm 14, and thence forwardly to full line position in Fig. 1 when a key is down. The underside of the forward end of bar 19 is tapered as at 19$^x$ to slidingly engage and push down a vertically slidable centering pin 21 in the forward end of frame arm 14, for a purpose to be presently described. Said pin has a head 21$^x$ normally pushed upward by a coil spring 22 and the lower end of the pin is pointed to fit a corresponding hole in the upper end of a matrix 23 which has previously been placed just below said pin by the downward movement of any one of the keys 9 and its bar 10 in the following manner.

A transverse rock shaft 24 journaled in opposite sides of frame 13 near its front end, is provided with two forwardly and upwardly extending arms 25 between the ends of which a bar 26 extends across the frame just below the key bars 10. Vertical arms 27 keyed to said shaft 24 extend upwardly therefrom adjacent each key bar, and at their upper ends are each pivotally connected to the rear end of a forwardly extending link 28, the front end of the latter being pivotally connected to the rear end of the sliding bar 29. The forward end of each bar carries a matrix 23, and the arrangement of the bars and links must be such that they all slide radially in a bearing plate 30 rigidly secured to the frame. This arrangement makes any one of the matrices come to a stop at a common point which is just under the previously described centering pin 21. It is readily understood that downward pressure on any key 9 makes its bar 10 press down on shaft 26 thereby swinging upper end of lever 27 forward and link 28 and matrix bar 29 is pushed forward. The action of the previously described rear lever 19 is timed so as to bring centering pin 21 into the upper end of a matrix the instant after the latter is placed under it and the matrix is pushed down into contact with the sheet 5. A small slit 31 in sheet 5, previously punched in a manner to be described, allows molten typemetal to be injected up through it and fills the type forming space of the matrix, thus forming each type while the matrix is down on the sheet, the molten metal instantly attaching to the top surface and becoming a part of the sheet 5 and forming a raised letter thereon corresponding to the mold of the matrix.

When a key is released from its downward pressure the matrix is pulled up enough to clear the raised type formed on the sheet by the friction of the centering pin, and any suitable spring action (not shown) brings the matrix bar back to its original position.

The method and means of injecting the type metal is the same as in monotype machines and consists in general of an upwardly projecting nozzle 32 which receives molten metal from a melting pot 32˟ and a small pump (not shown) which pumps the molten metal upwardly through the nozzle and a hole 33 in plate 7, through the previously described slot 31 in the sheet 5 at the instant the matrix is in place. Usually this process leaves some surplus metal sticking to the under side of the sheet when it cools, but this metal is instantly sheared off by any suitable device or means such as a shifting movement of plate 7 caused by the compression lever 19 which, on its back stroke, contacts with the lower arm of a rocking lever 34 pivoted at 35 and having its upper arm connected to the rear end of arm 7˟ of plate 7. A small compression coil spring 36 on said arm 7˟ and interposed between lug 14˟ and a fixed collar 37 on the bar causes plate 7 to keep in normal position. The edges of plate 7 around hole 33 being beveled inwardly and upwardly it is readily seen that the shifting movement of plate 7 will shear off the surplus metal on the under side of sheet 5. The nozzle 32 is automatically shifted to position 32˟˟ away from the opening 33 in the plate when the removal of surplus metal takes place, by means common to monotype machines (not shown), allowing said metal to drop back into the pot 32˟.

The means for punching the slits 31 in the type sheet consist simply of a vertically arranged punching bar 38 secured to the centering pin (see Fig. 3) and extending down parallel thereto far enough to punch a slot in the type sheet at the same time the centering pin is holding a matrix down in place. Thus when the sheet is automatically moved for the next letter the slot just punched will be in line under the next matrix to be used, permitting the nozzle to inject molten metal therethrough. It will be readily seen that during the process of making each letter the slot 31 is also filled with metal which is allowed to remain there, but the surplus metal on the lower side of the sheet is sheared off as described.

In Fig. 4 I have illustrated the upper right hand portion of a type sheet on which a line of raised type has been started, it being understood that the lines of type being at the right, the type sheet being shifted toward the right for each successive letter and a slot 31 is always found to the left of the last letter for the purpose previously described.

It is readily understood that with my process of making raised letters integral with a sheet, both of type metal, any size of typed sheet can be made and such sheet is readily bent to fit the curved surface of a printing cylinder and attached to any part of such cylinder, or such sheet may be left flat and mounted on a block as a "cut" for printing purposes.

My device practically eliminates the use of the present monotype machines and effects an enormous saving in the amount of type metal used.

What I claim is:

The method of making type for printing purposes which consists of casting raised letters of type metal on the surface of a sheet of similar metal, said letters each formed of molten type metal injected from the under side of the sheet through a punched slot in the latter and into a mold formed by a matrix resting on the top surface of the sheet, said injected, molten, letter-forming metal adapted to become permanently associated with the said sheet when the metal cools.

In testimony whereof I affix my signature.

JAMES F. LACKEY.